May 18, 1937.  E. NIBBS  2,081,016

FLEXIBLE COUPLING

Filed Jan. 9, 1936

Inventor:
Ernest Nibbs
By: Brown, Jackson, Boettcher + Dienner
Attys.

Patented May 18, 1937

2,081,016

UNITED STATES PATENT OFFICE 2,081,016

FLEXIBLE COUPLING

Ernest Nibbs, New London, Conn., assignor to Electric Boat Company, Groton, Conn., a corporation of New Jersey Application January 9, 1936, Serial No. 58,295

13 Claims. (Cl. 64—15)

This invention relates to shaft couplings, and has to do with means for providing a coupling between a drive shaft and a driven shaft effective for establishing a yielding driving connection between the shafts upon initiation of rotation of the drive shaft, and thereafter providing a positive driving connection between the shafts.

My invention is directed particularly to the provision of a coupling having a relatively great elastic deflection under load, which occupies relatively small space and can be assembled and disassembled with expedition and facility within the overall length of the complete coupling. A further object is to provide a coupling of this character in which a certain amount of dampening of the rotation of the drive shaft, upon initiation of rotation thereof, is produced for preventing objectionable jerks or jars in the transmission of rotation from the drive shaft to the driven shaft. It is also an object to provide a coupling which is selfcontained as to thrust or forces developed within the coupling in the use thereof. Further objects and advantages of my invention will appear from the detail description.

In the drawing:—

Figure 1:
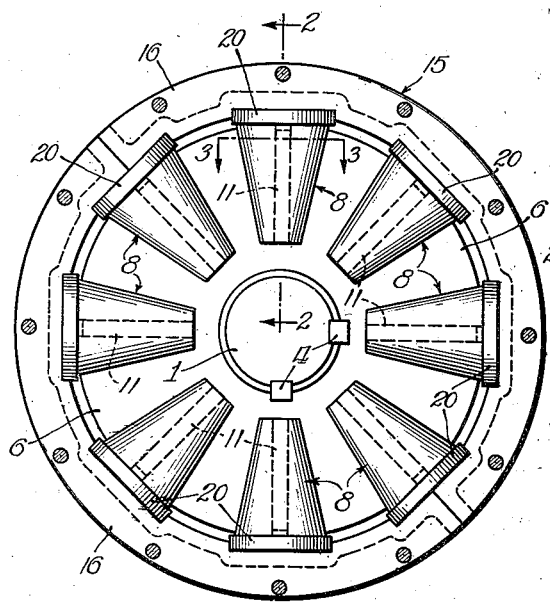
Figure 1 is a transverse vertical sectional view of a coupling embodying my invention, certain parts being shown in elevation, this view being taken through the center of the couplings substantially on line 1—1 of Figure 2.

I have shown my coupling as applied to the adjacent ends of two coaxial shafts 1 and 2 of which, for purposes of description, shaft 1 may be considered as the drive shaft and shaft 2 as the driven shaft. Flange members 3 are suitably secured, as by means of keys 4, upon the adjacent ends of the shafts. Each of the members 3 comprises a hub 5 which is secured upon the shaft and from which extends a flange 6 which projects outward from the shaft radially thereof. The opposed faces of flanges 6 are bored out from the periphery thereof to provide therein frusto-conical sockets 7, the longer axes of which extend radially of the flanges and the apices of which, if produced inward, meet at the axis of the associated shaft. Sockets 7 are disposed in pairs, those of each pair being aligned lengthwise of the shafts, and flare outward of the flanges 6, as shown.

Figure 3:
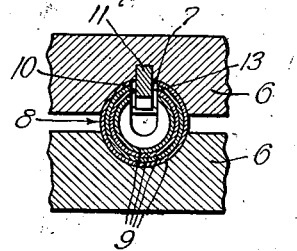
Figure 3 is a fragmentary sectional view taken substantially on line 3—3 of Figure 1.
Figure 4:
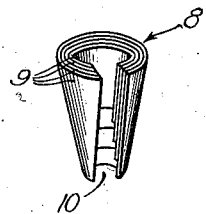
Figure 4 is a detail isometric view of one of the leaf spring structures.

A spring structure 8 fits into each pair of sockets 7. This structure is of laminated construction and comprises a plurality of laminations or leaves 9 bent into circular form, fitting one within the other and decreasing in width from the inner end of structure 8 toward the outer end thereof. The spring structure thus formed is provided with a slot 10 extending the full length thereof. This slot receives a key 11 disposed in a key slot 12 opening into socket 7 of one of the flanges 6. Key 11 is of less width than slot 10 so as to provide spaces 13 between the lateral faces of key 11 and the edges of the laminations 9 of structure 8 at the sides of slot 10, as shown in Figure 3. It will be noted that the spring structure 8 is open at its inner end and at its outer end.

Figure 2:
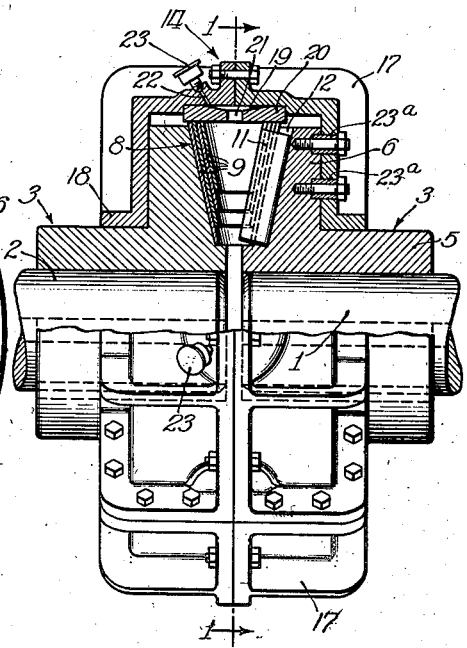
Figure 2 is a view partly in section and partly in side view, of a coupling embodying my invention, the sectional portion of this view being taken substantially on line 2—2 of Figure 1, certain parts being shown in elevation.

A sectional casing 14 encloses the flanges 6 and associated parts. This casing comprises two main cylindrical sections 15 each formed in two sections 16 of semi-circular shape in end view. The sections of the casing are provided with suitably disposed bolting flanges, whereby they may be bolted together so as to provide a closed housing which completely encloses the flanges 6 and associated parts, as shown in Figure 2, and the casing sections are further provided with suitable reenforcing ribs 17. Each main section 15 of the casing is provided with a hub 18, which hubs fit snugly about the hubs 5 of flange members 3. The latter members may be formed of steel and the casing 14 may be formed of bronze or other suitable bearing material of adequate strength. If desired, however, the casing may be formed of cast iron or of steel and lined with bearing metal, such as babbitt, for the bearing surfaces.

Casing 14 is provided, in the inner face of its circumferential wall, with cylindrical recesses 19 which receive hardened steel plates or disks 20 disposed to contact the outer ends of spring structures 9, the outer edges of leaves 9 of which are disposed in a common plane. The plates 20 confine spring structures 8 against outward movement, due to centrifugal force incident to rotation of the coupling, and also take up end thrust and rubbing incident to distortion of the spring structures. The outer surface of each of the plates 20 is dished so as to provide a space between the inner face of casing 14 and the plate, as shown in Figure 2. Each plate 20 is further provided with a central opening 21 into the associated spring structure 8. Casing 14 is provided with a duct 22 opening at its inner end into the space between the outer face of plate 20 and the inner face of casing 14. The outer end of duct 22 communicates with a grease cup 23 of known type attached to the casing in a known manner. In this manner lubricant is supplied from the exterior of the casing to the spring structure for lubricating the leaves 9 thereof and, since the spring structure is open at its inner end, the lubricant may flow between flanges 6 and thence to other bearing surfaces of the coupling. It is intended that the casing 14 be packed with grease for lubricating the main portions of the coupling, and the grease cups 23 and associated parts are intended more particularly for lubricating the spring structures, but may also provide supplemental means for lubricating the main portions of the coupling. Casing 14 is attached to one of the flanges 6 for rotation therewith, in a suitable manner, as by means of dowel pins 23a of known type and in suitable number. This assures that the disks or plates 20, where individual plates are used, are maintained in proper alignment with the respective spring structures 8.

Upon initiation of rotation of the drive shaft 1 spring structures 8 will be deformed so as to become more or less oval in cross section, due to the direct pressure exerted on the spring structure by flange 6 associated with drive shaft 1 and the reactance pressure exerted on the spring structure by flange 6 associated with the driven shaft 2. This deformation of the respective spring structures will continue until the edges of leaves 9 thereof, at the sides of slot 10, contact the side faces of key 11. When this occurs further deformation of the spring structures is prevented, and these structures then provide positive driving connections between the shafts, through the flange members 3. Upon initiation of rotation of drive shaft 1 the leaves 9 of the spring structures, during distortion of the latter, are in tight contact and offer appreciable frictional resistance to relative movement thereof incident to distortion of the spring structure. Further, the distortion of the spring structure creates an outward thrust of the leaves thereof against plate 20, resulting in additional frictional resistance to distortion of the spring structure as a whole. This frictional resistance between the leaves of the spring structure and between the spring structure as a whole and the plate 20, provides a desirable drag which opposes rotation of shaft 1. This drag serves to prevent any objectionable sudden jerks or jars in the transmission of rotation of shaft 1 to shaft 2. Also, since the spring structures 8 are of laminated construction, the resistance to distortion of these structures increases in accordance with increase in the angle of rotation of shaft 1, which is conducive to soft or smooth starting of rotation of shaft 2, thus avoiding objectionable stresses such as would cause injury to the coupling or excessive wear thereof. The coupling of my invention thus provides means whereby a desirable drag is imposed upon the drive shaft at the initiation of rotation thereof, while also providing yielding driving connections between the shafts during an appropriate angular rotative movement of shaft 1, and thereafter providing positive driving connections between the shafts, objectionable jerks or jars incident to transmission of rotation of the drive shaft to the driven shaft being eliminated.

The coupling as a whole is of relatively simple construction, compact and occupies small space. Casing 17, being formed in two main sections, each of which is divided into two parts, can be assembled and disassembled with expedition and facility within the overall length of the coupling. Upon removal of the casing the spring structures 8 may be removed, if necessary, radially of the flanges 6. It will thus be seen that the coupling is readily accessible for replacement and repairs and can easily be disassembled within its overall length which, from the practical standpoint, is a decided advantage.

It will be understood by those skilled in the art that changes in construction and arrangement of parts may be resorted to, without departing from the field and scope of my invention, and I intend to include all such variations, as fall within the scope of the appended claims, in this application in which the preferred form only of my invention is disclosed.

What I claim is:—

1. In combination in a shaft coupling, two coaxial shafts disposed with an end of one adjacent an end of the other, members secured on the adjacent ends of said shafts provided with substantially frusto-conical sockets in their opposed faces disposed in pairs, the sockets of each pair being in substantial alignment, and frusto-conical leaf spring structures fitting into said pairs of sockets and providing a driving connection between said flange members.

2. In combination in a coupling, two juxtaposed coaxial members, one a drive member and the other a driven member, said members being provided in their opposed faces with substantially frusto-conical sockets disposed in pairs, the sockets of each pair being aligned and frusto-conical leaf spring structures fitting into said pairs of sockets and providing a driving connection between said members.

3. In combination in a shaft coupling, two coaxial shafts disposed with an end of one adjacent an end of the other, radial flanges secured on the adjacent ends of said shafts and provided in their opposed faces with radial sockets disposed in pairs, the sockets of each pair being aligned lengthwise of said shafts, leaf spring structures fitting into said pairs of sockets and each provided with a lengthwise slot, and keys secured to one of said flanges and projecting into the slots of said spring structures, said keys being of less width than said slots.

4. In combination in a shaft coupling, two coaxial shafts disposed with an end of one adjacent an end of the other, radial flanges secured on the adjacent ends of said shafts and provided in their opposed faces with substantially frusto-conical radial sockets disposed in pairs, the sockets of each pair being aligned lengthwise of said shafts, and frusto-conical leaf spring structures fitting into said pairs of sockets.

5. In combination in a shaft coupling, two coaxial shafts disposed with an end of one adjacent an end of the other, radial flanges secured on the adjacent ends of said shafts and provided in their opposed faces with substantially frusto-conical radial sockets disposed in pairs, the sockets of each pair being aligned lengthwise of said shafts, frusto-conical leaf spring structures fitting into said pairs of sockets, and means cooperating with said spring structures for limiting distortion thereof and establishing positive driving connections between said flanges when said spring structures have been distorted to a predetermined extent.

6. In combination in a shaft coupling, two coaxial shafts disposed with an end of one adjacent an end of the other, radial flanges secured on the adjacent ends of said shafts and provided in their opposed faces with substantially frusto-conical radial sockets disposed in pairs, the sockets of each pair being aligned lengthwise of said shafts, and laminated frusto-conical leaf spring structures fitting into said pairs of sockets.

7. In combination in a shaft coupling, two coaxial shafts disposed with an end of one adjacent an end of the other, radial flanges secured on the adjacent ends of said shafts and provided in their opposed faces with substantially frusto-conical radial sockets disposed in pairs, the sockets of each pair being aligned lengthwise of said shafts, laminated frusto-conical leaf spring structures into said pairs of sockets, the laminations of said spring structures decreasing in width toward the outer ends thereof.

8. In combination in a shaft coupling, two coaxial shafts disposed with an end of one adjacent an end of the other, radial flanges secured on the adjacent ends of said shafts and provided in their opposed faces with substantially frusto-conical radial sockets disposed in pairs, the sockets of each pair being aligned lengthwise of said shafts, laminated frusto-conical leaf spring structures fitting into said pairs of sockets and each provided with a lengthwise slot, and means cooperating wtih the slotted portions of said structures for limiting distortion thereof and establishing positive driving connections between said flanges when said spring structures have been distorted to a predetermined extent.

9. In combination in a shaft coupling, two coaxial shafts disposed with an end of one adjacent an end of the other, radial flanges secured on the adjacent ends of said shafts and provided in their opposed faces with substantially frusto-conical radial sockets disposed in pairs, the sockets of each pair being aligned lengthwise of said shafts, laminated frusto-conical leaf spring structures fitting into said pairs of sockets and open at their inner ends, a casing enclosing said flanges, means within the casing confining said spring structures against outward movement, and means for supplying lubricant from the exterior of said casing to the interior of said spring structures.

10. In combination in a shaft coupling, two coaxial shafts disposed with an end of one adjacent an end of the other, radial flanges secured on the adjacent ends of said shafts and provided in their opposed faces with substantially frusto-conical radial sockets disposed in pairs, the sockets of each pair being aligned lengthwise of said shafts, laminated frusto-conical leaf spring structures fitting into said pairs of sockets and open at their inner ends, a casing enclosing said flanges and connected to one thereof for rotation therewith, said casing having recesses in its inner face aligned with said spring structures, plates mounted in said recesses with their outer faces spaced from the casing, said plates contacting the outer ends of said spring structures and confining them against outward movement, each of said plates having an opening therethrough for admission of lubricant to the associated spring structure, and means for supplying lubricant from the exterior of said casing to the spaces between said plates and said casing.

11. In combination in a shaft coupling, two coaxial shafts disposed with an end of one adjacent an end of the other, radial flanges secured on the adjacent ends of said shafts and provided in their opposed faces with substantially frusto-conical radial sockets disposed in pairs, the sockets of each pair being aligned lengthwise of said shafts, frusto-conical leaf spring structures fitting into said pairs of sockets and open at their inner ends, a casing enclosing said flanges, means within the casing confining said spring structures against outward movement, and means for supplying lubricant from the exterior of said casing to the interior of said spring structures.

12. In combination in a shaft coupling, two coaxial shafts disposed with an end of one adjacent an end of the other, radial flanges secured on the adjacent ends of said shafts and provided in their opposed faces with radial sockets disposed in pairs, the sockets of each pair being aligned lengthwise of said shafts, spring structures fitting into said pairs of sockets and distortable for providing yielding driving connection between said flanges, said spring structures tending to extend lengthwise radially of said flanges when distorted incident to rotation of one of said flanges relative to the other thereof, and means cooperating with said flanges and said spring structures for confining the latter against lengthwise extension and exerting a braking effect resisting rotation of one of said flanges relative to the other flange.

13. In combination in a shaft coupling, two juxtaposed coaxial members, one a drive member and the other a driven member, said members being provided in their opposed faces with sockets disposed in pairs, spring structures fitting into said pairs of sockets and distortable for providing yielding driving connections between said members, said spring structures tending to extend lengthwise when distorted incident to rotation of one of said members relative to the other thereof, and means cooperating with said members and said spring structures for confining the latter against lengthwise extension and exerting a braking effect resisting rotation of one of said members relative to the other member.

ERNEST NIBBS.

CERTIFICATE OF CORRECTION.

Patent No. 2,081,016.                                              May 18, 1937.

ERNEST NIBBS.

It is hereby certified that error appears in the printed specification of the above numbered patent requiring correction as follows: Page 3, first column, line 18, claim 7, before "into" insert the word fitting; and that the said Letters Patent should be read with this correction therein that the same may conform to the record of the case in the Patent Office.

Signed and sealed this 29th day of June, A. D. 1937.

Henry Van Arsdale (Seal)                                          Acting Commissioner of Patents.